(12) United States Patent
Diep et al.

(10) Patent No.: US 10,165,659 B2
(45) Date of Patent: Dec. 25, 2018

(54) LIGHTING SYSTEM CONTROLLER CONFIGURED TO BE REMOTELY CONTROLLED VIA A BLUETOOTH-ENABLED WIRELESS DEVICE FOR CONTROLLING OUTDOOR LED LIGHTING

(71) Applicant: J & J ELECTRONICS, LLC, Irvine, CA (US)

(72) Inventors: Alan V. Diep, Foothill Ranch, CA (US); Michael P. Babb, La Verne, CA (US)

(73) Assignee: J & J ELECTRONICS, LLC, Irvine, CA (US)

( * ) Notice: Subject to any disclaimer, the term of this patent is extended or adjusted under 35 U.S.C. 154(b) by 0 days.

(21) Appl. No.: 15/794,743

(22) Filed: Oct. 26, 2017

(65) Prior Publication Data
US 2018/0116041 A1 Apr. 26, 2018

Related U.S. Application Data

(63) Continuation-in-part of application No. 29/582,286, filed on Oct. 26, 2016, now Pat. No. Des. 825,491.

(60) Provisional application No. 62/413,368, filed on Oct. 26, 2016.

(51) Int. Cl.
| | |
|---|---|
| *H05B 37/02* | (2006.01) |
| *H05B 33/08* | (2006.01) |
| *H04B 10/50* | (2013.01) |
| *F21V 23/04* | (2006.01) |
| *H04W 4/80* | (2018.01) |
| *F21Y 115/10* | (2016.01) |
| *F21W 131/10* | (2006.01) |

(52) U.S. Cl.
CPC ..... *H05B 37/0272* (2013.01); *F21V 23/0435* (2013.01); *H04B 10/502* (2013.01); *H04W 4/80* (2018.02); *H05B 33/0842* (2013.01); *H05B 37/029* (2013.01); *F21W 2131/10* (2013.01); *F21Y 2115/10* (2016.08)

(58) Field of Classification Search
CPC ............... H05B 37/02; H05B 37/0245; H05B 37/0272; H05B 37/029; H05B 33/0842; F21W 2131/10; F21V 23/0435; H04B 10/502; F21Y 2115/10
See application file for complete search history.

(56) References Cited

U.S. PATENT DOCUMENTS

| | | |
|---|---|---|
| 5,982,103 A | 11/1999 | Mosebrook et al. |
| D489,337 S | 5/2004 | Murray |
| 7,274,117 B1 | 9/2007 | Viola et al. |

(Continued)

*Primary Examiner* — Haissa Philogene
(74) *Attorney, Agent, or Firm* — Gardner Groff Greenwald & Villanueva, PC (57) ABSTRACT

An LED lighting control device is provided that is capable of being wirelessly and remotely controlled without the need for an Internet connection. The LED lighting control device is configured to be operated in a manual mode of operations and in remote mode of operations. In the remote mode of operations, the LED lighting control device is remotely and wirelessly controlled by a user operating a Bluetooth-enable device that wireless communicates with the LED lighting control device to cause the LED lighting control device to control operations of outdoor LED lighting that is electrically coupled to the LED lighting control device.

20 Claims, 11 Drawing Sheets

(56) References Cited

U.S. PATENT DOCUMENTS

| | | |
|---|---|---|
| D603,345 S | 11/2009 | Melzner et al. |
| D604,254 S | 11/2009 | Lanfear et al. |
| 7,791,595 B2 | 9/2010 | Altonen et al. |
| D669,036 S | 10/2012 | Apruzzese |
| 8,364,319 B2 | 1/2013 | Roosli |
| D689,441 S | 9/2013 | Kah, Jr. et al. |
| 8,742,686 B2 * | 6/2014 | Zampini, II ....... H05B 33/0857 257/13 |
| D722,981 S | 2/2015 | Livschitz et al. |
| D724,036 S | 3/2015 | Cha et al. |
| 9,198,259 B2 | 11/2015 | Hoang |
| 9,210,773 B1 | 12/2015 | Sargent et al. |
| 9,345,114 B2 * | 5/2016 | Kim .................... H05B 37/0272 |
| 9,370,073 B2 * | 6/2016 | Pi ........................ H05B 33/0863 |
| 9,386,666 B2 | 7/2016 | Economy |
| 9,392,657 B2 * | 7/2016 | Lee .................... H05B 33/0842 |
| 9,445,480 B2 * | 9/2016 | Min .................... H05B 33/0842 |
| 9,544,977 B2 | 1/2017 | Economy et al. |
| 9,742,580 B2 | 8/2017 | Camden et al. |
| 9,807,845 B2 | 10/2017 | Clark et al. |
| 2005/0049730 A1 | 3/2005 | Adamson et al. |
| 2017/0245353 A1 | 8/2017 | Taipale et al. |

\* cited by examiner

LIGHTING SYSTEM CONTROLLER CONFIGURED TO BE REMOTELY CONTROLLED VIA A BLUETOOTH-ENABLED WIRELESS DEVICE FOR CONTROLLING OUTDOOR LED LIGHTING

CROSS-REFERENCE TO RELATED APPLICATIONS AND PRIORITY CLAIM

This application is a U.S. nonprovisional application that claims priority to, and the benefit of the filing date of, a U.S. provisional application having application Ser. No. 62/413,368, filed on Oct. 26, 2016, entitled "BLUETOOTH CONTROLLER FOR LED LIGHTING," which is incorporated by reference herein in its entirety. This U.S. nonprovisional application is a continuation-in-part and claims priority to, and the benefit of the filing date of, a U.S. design application having application Ser. No. 29/582,286, filed on Oct. 26, 2016, entitled "LIGHTING CONTROLLER," which is incorporated by reference herein in its entirety.

TECHNICAL FIELD OF THE INVENTION

The invention relates generally to the field of electronics, and more particularly, to lighting controllers useable to control light emitting diodes (LEDs) for lighting of outdoor areas, such as swimming pools, spas, water features and pathways, for example.

BACKGROUND OF THE INVENTION

LEDs are solid state lamps that use semiconductor material, instead of a filament or neon gas, to emit light. When compared to traditional incandescent light bulbs, LEDs offer a number of advantages. For example, because LEDs operate on low voltage and consume less power, they are less expensive to operate and generate significantly less heat than traditional light bulbs. Also, because LEDs are of solid state design, they are more durable and less likely to break than traditional bulbs. Another advantage of LEDs is their long life. Some LED lamps can operate for up to 100,000 hours, compared to about 1500 hours for a standard filament light bulb. Moreover, LEDs are environmentally friendly, contain no mercury and produce no electromagnetic emissions. Another advantage is that a single LED bulb can produce many different colors without the need for colored coatings or lenses.

In view of their numerous advantages, LEDs are being used in many applications where fluorescent or incandescent lighting was previously used. For example, LED lighting is frequently being used to replace older incandescent lighting in swimming pools, spas, water features (e.g., decorative water falls), along pathways or walkways, and the like. In some instances, the replacement LED lighting may include different colored LEDs or multicolor LEDs and a control device that is programmed to cause the LEDs to emit light in a number of different lighting schemes (e.g., light shows using different colors and/or patterns of emitted light). Such LED lighting control devices typically have a user interface, such as a dial or selector on the face of the control device, for example, to allow a user to select a desired lighting scheme from a variety of pre-programmed lighting schemes.

Some such LED lighting control devices are also capable of being controlled remotely via a hard-wired or wireless Internet connection. To control an LED lighting control device via a wireless internet connection, a user runs a web browser on a smart phone or the like to remotely control the LED lighting control device, which must be connected to the Internet. The LED lighting that is controlled by the LED lighting control device is hard-wired to the LED lighting control device. Typically a panel, or outlet box, that is installed in the pool/spa area has multiple control devices for controlling various systems or devices that are in the pool/spa area. One of these control devices may be an LED lighting control device that controls the LED lighting.

There are disadvantages to controlling the LED lighting control device via a wireless Internet connection. One disadvantage is that if the Internet connection is lost or is otherwise unavailable, the LED lighting cannot be remotely controlled using a web browser on a smart phone or similar device, which can be problematic if the user is at a remote location and cannot physically access the panel or outlet box that contains the LED lighting control device. Another disadvantage is that Internet services are not available in all places, and where they are available, a monthly subscription fee typically must be paid to maintain the service. Yet another disadvantage is that if the panel or outlet box was not Internet-ready at the time that it was installed, which is typically when the house was built, it is difficult to retrofit the panel or outlet box with an LED lighting control device that is configured to be connected to the Internet. As indicated above, the panel or outlet box typically includes multiple control devices and associated wiring and electrical circuitry, which can make adding such an LED lighting control device difficult or impossible.

A need exists for an LED lighting system that is capable of being wirelessly and remotely controlled without the need for an Internet connection. A need also exists for an LED lighting control device that is capable of being remotely controlled to allow a user to remotely and wirelessly control outdoor LED lighting without the need for an Internet connection.

WRITTEN DESCRIPTION

In accordance with representative embodiments, an LED lighting control device of an LED lighting system is provided that is capable of being wirelessly and remotely controlled without the need for an Internet connection. The LED lighting control device is configured to be operated in a manual mode of operations and in remote mode of operations. In the remote mode of operations, the LED lighting control device is remotely and wirelessly controlled by a user operating a Bluetooth-enabled device that wireless communicates with the LED lighting control device to cause the LED lighting control device to control operations of outdoor LED lighting that is electrically coupled to the LED lighting control device. Exemplary, or representative, embodiments of an LED lighting system and of the LED lighting control device are described below with reference to the figures, in which like reference numerals represent like components, elements or features.

It should also be understood that the word "example," as used herein, is intended to be non-exclusionary and non-limiting in nature. More particularly, the word "exemplary," as used herein, indicates one among several examples, and it should be understood that no undue emphasis or preference is being directed to the particular example being described. It should also be understood that the word "exemplary," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. Where a first device is said to be directly connected or directly coupled to a second device, this encompasses examples where the two devices are connected together without any intervening devices other than bonding material or devices. Where a first device is said to be coupled to a second device, this encompasses examples where the two devices are directly connected together without any intervening devices other than bonding material or devices and examples where the first and second devices are connected to one another via one or more intervening devices. The term "electrically coupled," as that term is used herein, encompasses examples where two devices or elements are directly electrically connected together without any intervening devices or elements and examples where the two devices or elements are electrically connected to one another via one or more intervening devices or elements.

A "control device," as that term is used herein, denotes an electronic component or circuit that is configured to carry out operations by which the control device controls some other device. The control device may be, for example, a microprocessor or a microcontroller that executes computer instructions in the form of software and/or firmware. As another example, the control device may be electrical hardware that is configured in such a way as to carry out operations by which the control device controls some other device. As yet another example, the control device may be a combination of electrical hardware and software and/or firmware configured in such a way as to carry out operations by which the control device controls some other device. References herein to a system comprising "control device" should be interpreted as a system having one or more control devices.

The term "memory" or "memory device", as those terms are used herein, are intended to denote a non-transitory computer-readable storage medium that is capable of storing computer instructions, or computer code, for execution by one or more control devices. Memory may also store various types of data, which is of particular focus of the inventive principles and concepts discussed herein. References herein to "memory" or "memory device" should be interpreted as one or more memories or memory devices. The memory may, for example, be multiple memories within the same system. The memory may also be multiple memories distributed amongst multiple systems or control devices.

A "Bluetooth-enabled device," as that term is used herein, is a device that is capable of communicating over a Bluetooth wireless link and that is capable of executing an application program comprising software and/or firmware that allows the device to interact with the LED lighting control device to cause the LED lighting control device to control LED lighting that is electrically coupled to the LED lighting control device. A "Bluetooth wireless link," as that term is used herein, denotes a wireless link that operates in accordance with Bluetooth® standards of the Bluetooth Special Interest Group (SIG), which is a corporation headquartered in Kirkland, Wash. The Bluetooth® standards are wireless technology standards for exchanging data over short distances using short-wavelength ultra high frequency (UHF) radio waves in the industrial, scientific and medical (ISM) radio band.

Figure 1:
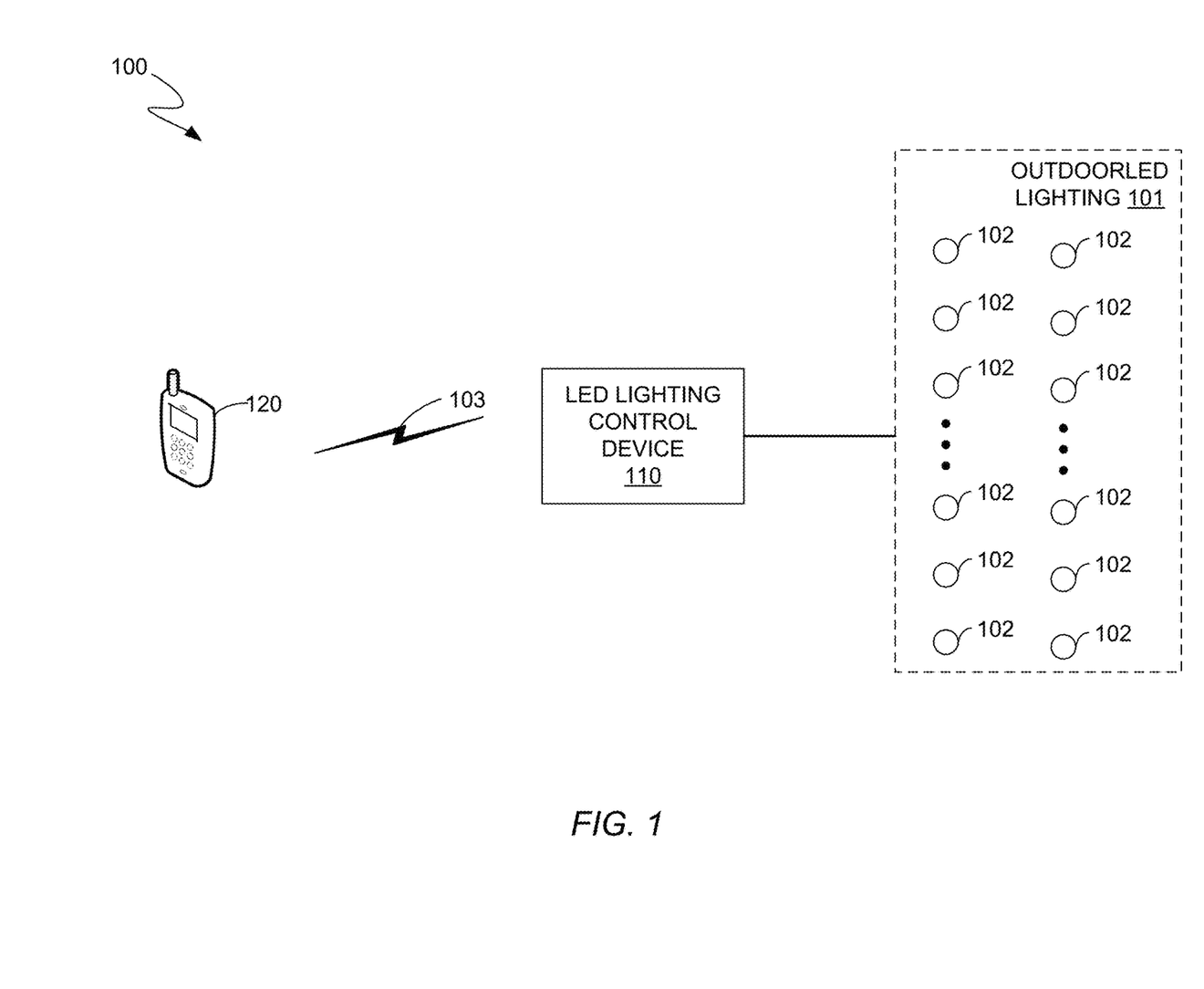
FIG. 1 is a block diagram of an LED lighting system in accordance with a representative embodiment.

FIG. 1 illustrates a block diagram of an LED lighting system 100 in accordance with a representative embodiment. The LED lighting system 100 comprises an LED lighting control device 110, outdoor LED lighting 101 that is electrically coupled to, and controlled by, the LED lighting control device 110, and a Bluetooth-enabled device 120 that communicates wirelessly over a Bluetooth wireless link 103 with the LED lighting control device 110. The LED lighting control device 110 preferably is configured to be operated in a manual mode of operations and in a remote mode of operations. In accordance with a representative embodiment, the LED lighting control device 110 has a user interface (UI) with which a user can interact when the LED lighting control device 110 is in the manual mode of operations to control the outdoor LED lighting 101. The UI is described below in more detail with reference to FIG. 6A.

In the remote mode of operations, the LED lighting control device 110 is remotely and wirelessly controlled by a user operating the Bluetooth-enable device 120, which wireless communicates with the LED lighting control device 110 via the Bluetooth wireless link 103 to cause the LED lighting control device 110 to control the outdoor LED lighting 101. The LED lighting 101 is an arrangement of one or more LEDs 102. The outdoor LED lighting 101 typically includes a plurality of LEDs 102 of multiple colors and a control device (not shown) that is configured to communicate with the LED lighting controller.

In accordance with a representative embodiment, the Bluetooth-enabled device 120 executes a software application program that is specifically designed to allow the user to remotely interface with the LED lighting control device 110 to control the outdoor LED lighting 101. In accordance with a preferred embodiment, the software application program generates a UI on a display device of the Bluetooth-enabled device 120 that looks similar or identical to the UI of the LED lighting control device 110. This allows the user to interact with the Bluetooth-enabled device 120 in the remote mode of operations in a manner that is similar to the manner in which the user interacts with the LED lighting control device 110 in the manual mode of operations to control the outdoor LED lighting 101.

Figure 2:
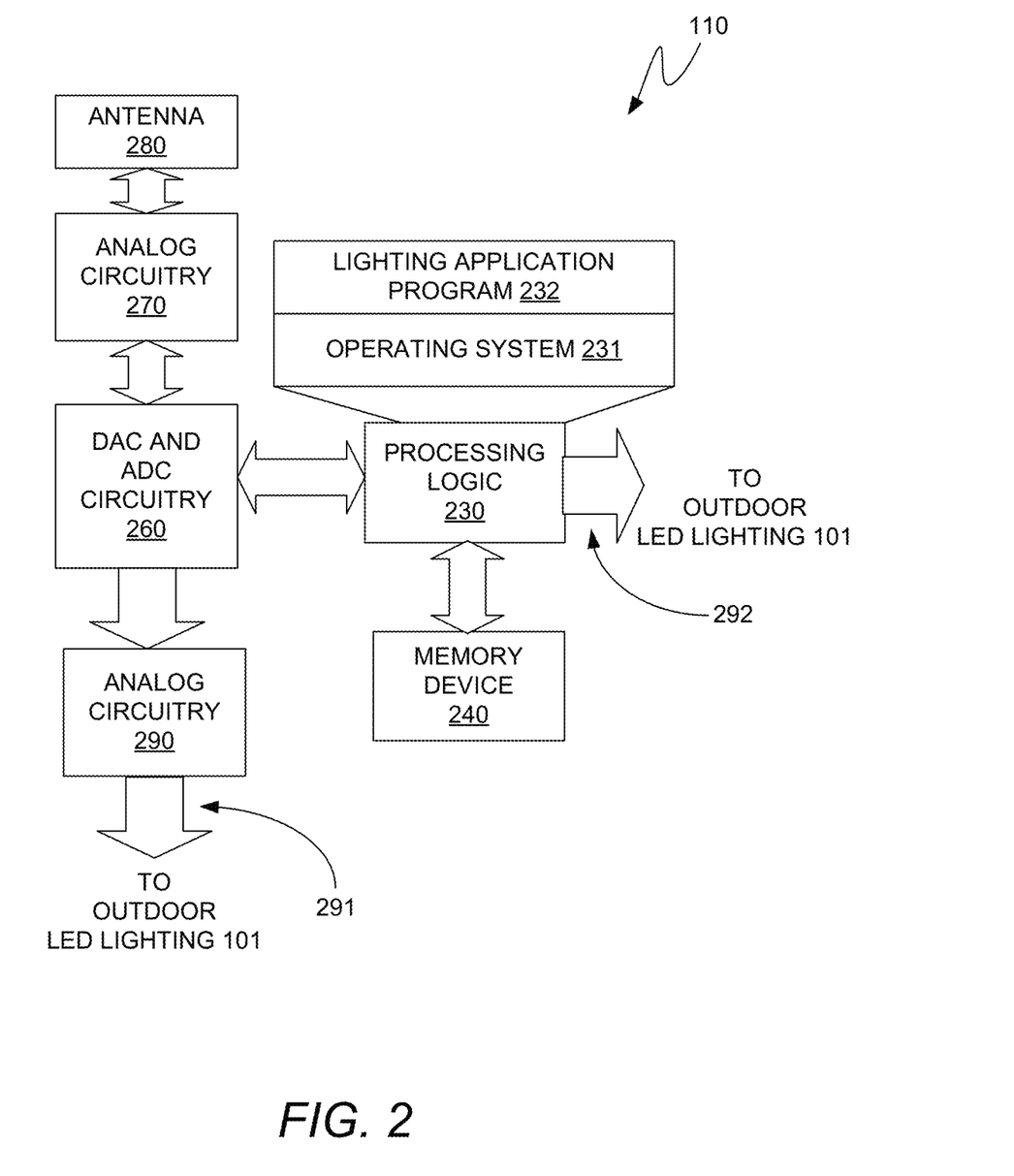
FIG. 2 is a block diagram of the LED lighting control device shown in FIG. 1 in accordance with a representative embodiment.

FIG. 2 illustrates a block diagram of the LED lighting control device 110 in accordance with a representative embodiment. The LED lighting control device 110 comprises processing logic 230, a memory device 240, digital-to-analog conversion (DAC) and analog-to-digital conversion (ADC) circuitry 260, front end analog circuitry 270 and an antenna 280. Depending on the manner in which the LED lighting control device 110 communicates with the outdoor LED lighting 101, the LED lighting control device 110 may also include analog circuitry 290 that sends analog signals via an analog interface 291 to the outdoor LED lighting 101 to control the outdoor LED lighting 101. In some cases, the outdoor LED lighting 101 has its own control device (not shown) that operates in the digital domain, in which case the processing logic 230 may send digital signals via a digital interface 292 to the control device of the outdoor LED lighting 101 to control its operations.

For example, in accordance with an embodiment, based on a user-selected lighting scheme, the LED lighting control device 110 turns the power on and off rapidly a particular number of times to instruct the control device of the outdoor LED lighting 101 to cause the LEDs 102 to display a particular lighting scheme. For example, to cause the outdoor LED lighting 101 to display a lighting scheme corresponding to a solid green color, the LED lighting control device 110 may turn the power on and off rapidly five times, whereas to cause the outdoor LED lighting 101 to display a lighting scheme corresponding to a particular light show made up of a plurality of different colors displayed in a particular sequence, the LED lighting control device 110 may turn the power on and off rapidly eleven times. The control device of the outdoor LED lighting 101 executes firmware that interprets these on/off power sequences and causes the outdoor LED lighting 101 to display the user-selected lighting scheme. This may be accomplished entirely in the digital domain via the digital interface 292, entirely in the analog domain via the analog interface 291 interfacing with analog circuitry (not shown) of the outdoor LED lighting 101, or partially in the digital domain and partially in the analog domain using the analog and digital interfaces 291 and 292, respectively.

The processing logic 230 may be implemented solely in hardware or in a combination of hardware and software and/or firmware. For illustrative purposes, it is assumed that the processing logic 230 is implemented as a microcontroller or a microprocessor that executes software and/or firmware of a lighting application program 232. In accordance with a representative embodiment, the memory device 240 stores computer instructions comprising the lighting application program 232, which is executed by the processing logic 230 when the LED lighting control device 110 is operating in the remote mode of operations and being controlled by the Bluetooth-enabled device 120. In accordance with an embodiment, the processing logic 230 executes computer instructions comprising an operating system 231 that controls the operations of the LED lighting control device 110, including operations performed by the LED lighting control device 110 when the processing logic 230 is executing the lighting application program 232.

When the LED lighting control device 110 is operating in the remote mode of operations, the antenna 280 receives commands communicated by the Bluetooth-enabled device 120 over the Bluetooth wireless link 103 to the LED lighting control device 110. The analog circuitry 270 performs typical analog front end operations to demodulate and decode the Bluetooth wireless signals. ADC circuitry of the DAC and ADC circuitry 260 converts analog signals output from the analog circuitry 270 into digital signals and provides them to the processing logic 230. The processing logic 230 executing the lighting application program 232 interprets the commands contained in the digital signals and generates lighting control signals for controlling the outdoor LED lighting 101 in accordance with the commands. The lighting control signals are output from the LED lighting control device 110 via the analog interface 291 and/or via the digital interface 292 to the outdoor LED lighting system 101 and control it in the above-described manner.

Although there is typically no reason for the LED lighting control device 110 to send commands or data to the Bluetooth-enabled device 120, in accordance with an embodiment, messages may be sent by the LED lighting control device 110 over the Bluetooth wireless link 103 to the Bluetooth-enabled device 120. For example, the LED lighting control device 110 may send messages to the Bluetooth-enabled device 120 concerning the status of the outdoor LED lighting 101, whether or not an operation requested by the Bluetooth-enabled device 120 is capable of being performed, whether or not the outdoor LED lighting 101 is properly connected to the LED lighting control device 110, etc. In such cases, the messages are output from the processing logic 230 to the DAC and ADC circuitry 260, which converts them into analog signals. The analog circuitry 270 then causes Bluetooth wireless signals to be generated based on the analog signals and transmitted via the antenna 280 over the Bluetooth wireless link 103 to the Bluetooth-enabled device 120.

As indicated above, the processing logic 230 is typically a device that is programmable with software and/or firmware, such as a microprocessor or a microcontroller, for example, but may comprise other types of logic such as, for example, a programmable gate array (PGA), a programmable logic array (PLA), an application specific integrated circuit (ASIC), etc. The memory device 240 and the processing logic 230 may be integrated into a single device, such as an integrated circuit (IC) chip, or they may be separate devices, such as separate IC chips that are interconnected via a bus. The memory device 240 is typically a solid state memory device, such as a random access memory (RAM) chip, a read only memory (ROM) chip, a flash memory chip, etc., but could be some other type of memory device, such as an optical or magnetic memory device, for example.

Figure 3:
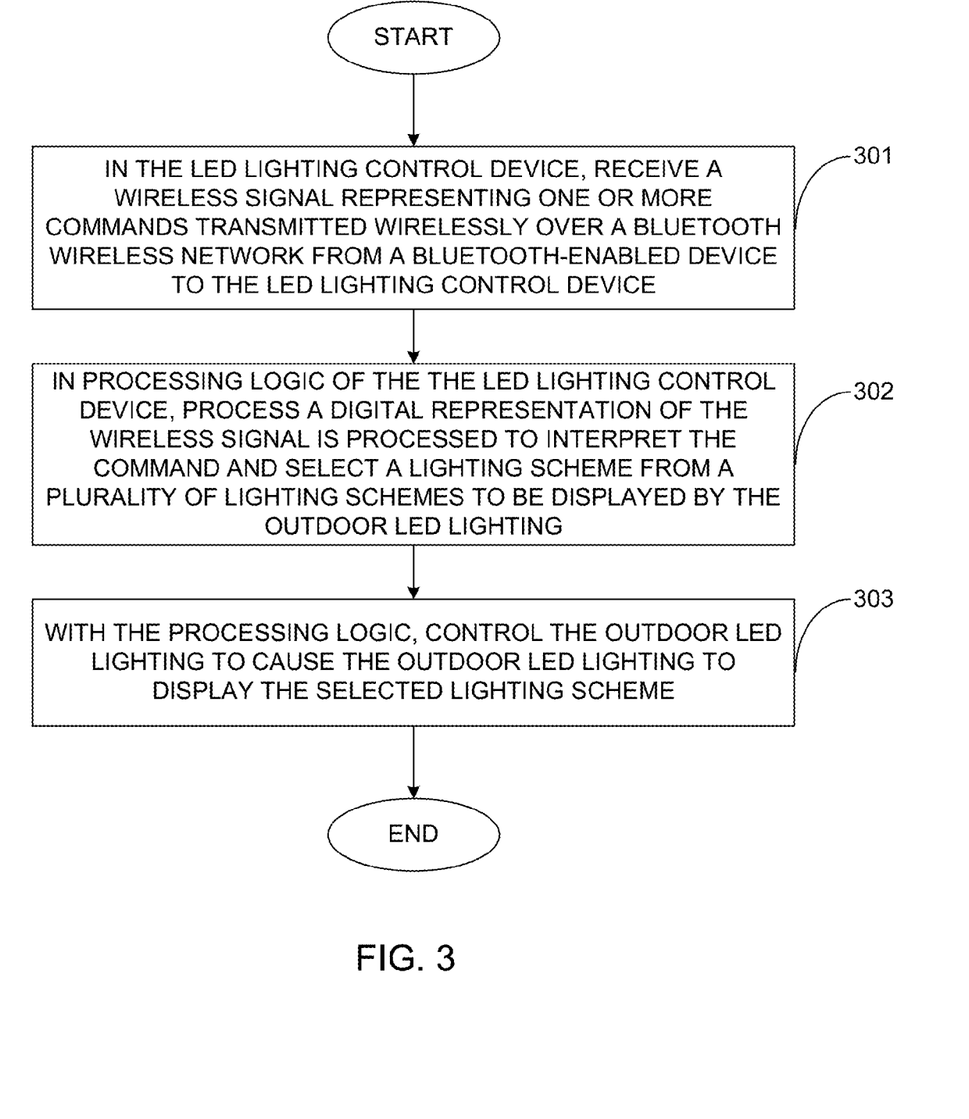
FIG. 3 is a flow diagram that represents the method performed by the LED lighting control device shown in FIG. 2 in accordance with an embodiment.

FIG. 3 is a flow diagram that represents the method performed by the LED lighting control device 110 of the LED lighting system 100 shown in FIG. 1 in accordance with an embodiment. In the LED lighting control device 110 operating in a remote mode of operations and being electrically coupled to the outdoor LED lighting 101, a wireless signal representing one or more commands transmitted wirelessly over the Bluetooth wireless network 103 from the Bluetooth-enabled device 120 to the LED lighting control device 110 is received in the LED lighting control device 110, as indicated by block 301. In the processing logic 230 of the LED lighting control device 110, a digital representation of the wireless signal is processed to interpret the command and a lighting scheme to be displayed by the outdoor LED lighting 101 is selected from a plurality of lighting schemes, as indicated by block 302. The processing logic 230 controls the outdoor LED lighting 101 to cause the outdoor LED lighting 101 to display the selected lighting scheme, as indicated by block 303.

Figure 4:
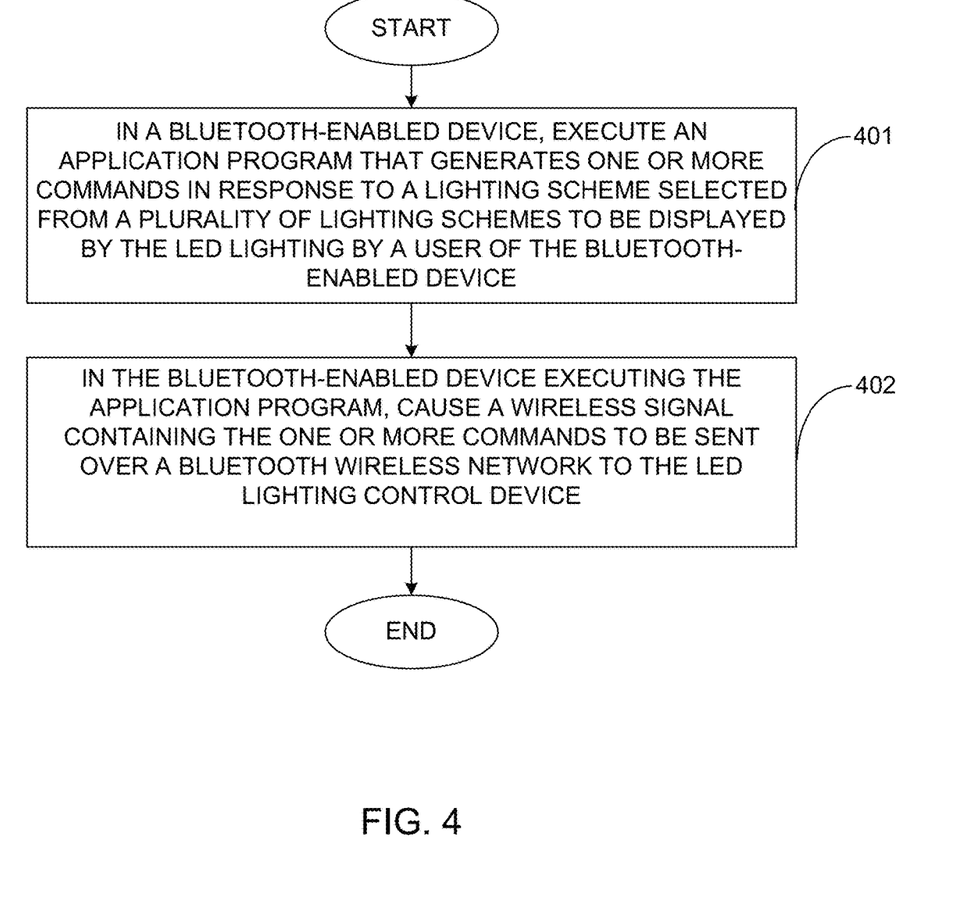
FIG. 4 is a flow diagram that represents the method performed by the Bluetooth-enabled device shown in FIG. 1 in accordance with an embodiment to control the outdoor LED lighting shown in FIG. 1.

FIG. 4 is a flow diagram that represents the method performed by the Bluetooth-enabled device 120 in accordance with an embodiment to control outdoor LED lighting. In the Bluetooth-enabled device 120 configured to remotely control the outdoor LED lighting 101, an application program is executed that generates one or more commands in response to a lighting scheme selected from a plurality of lighting schemes by the user of the Bluetooth-enabled device 120 to be displayed by the outdoor LED lighting 101, as indicated by block 401. The Bluetooth-enabled device 120 causes a wireless signal containing the one or more commands to be sent over the Bluetooth wireless network 103 to the LED lighting control device 110, as indicated by block 402. As indicated above, the LED lighting control device 110 receives the wireless signal, processes a digital representation of the wireless signal to interpret the one or more commands and causes the outdoor LED lighting 101 to display the user-selected lighting scheme.

Figure 5:
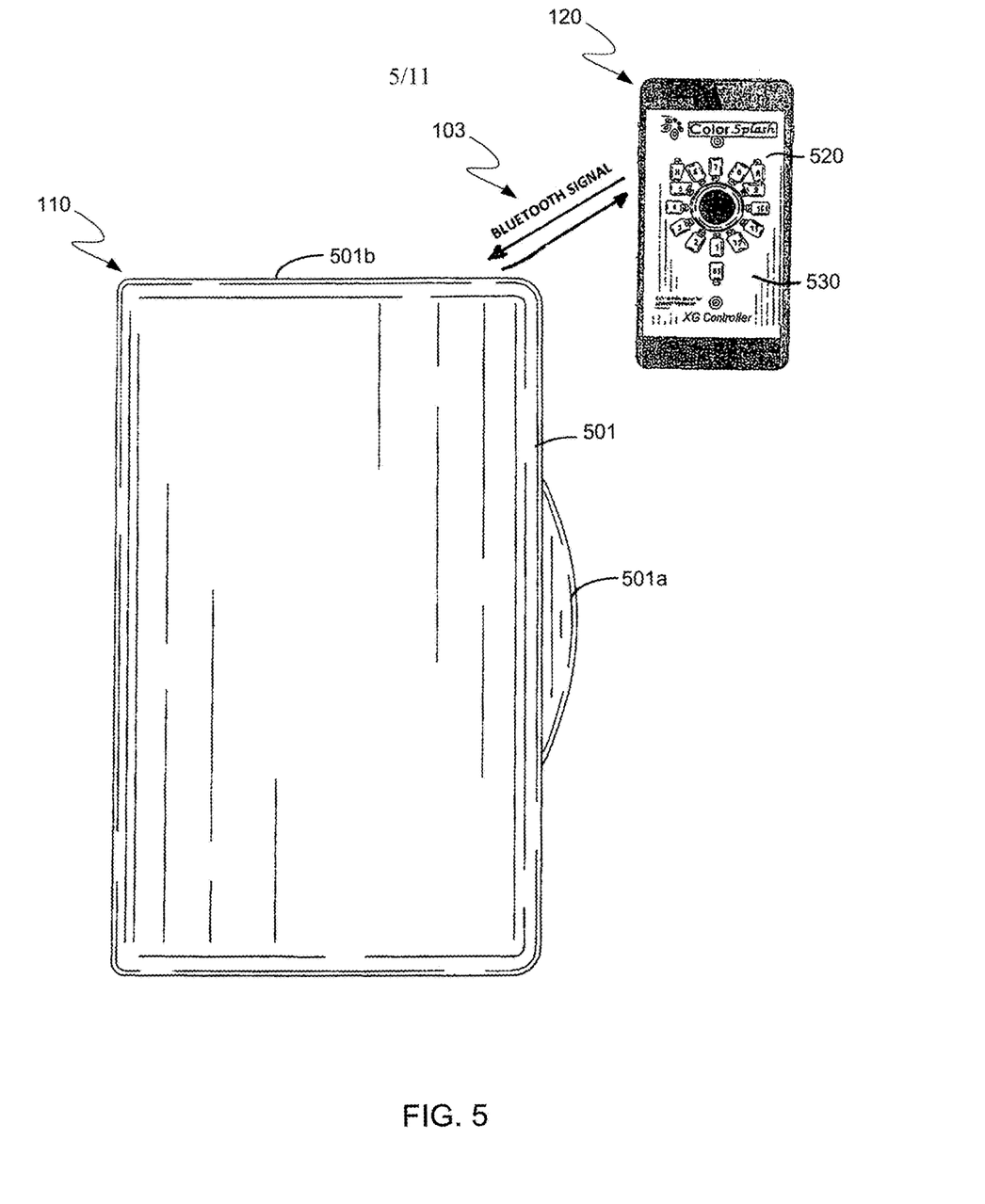
FIG. 5 illustrates a front view of the LED lighting control device shown in FIG. 1 in accordance with a representative embodiment in a closed position in which a door of the LED lighting control device is closed to protect the user interface of the LED lighting control device from the environment.

FIG. 5 illustrates a front view of the LED lighting control device 110 in accordance with a representative embodiment in a closed position in which a door 501 of the LED lighting control device 110 is closed to protect the UI of the LED lighting control device 110 from the environment. In FIG. 5, the LED lighting control device 110 is shown in communication via the Bluetooth wireless link 103 with the Bluetooth-enabled device 120, which is a smart phone in accordance with this representative embodiment. The door 501 includes a tab 501a that allows the user to easily grip the door 501 to move the door 501 from the closed position to an opened position, and vice versa. The door 501 is part of a housing 501b of the LED lighting control device 110 that houses the components shown in FIG. 2.

Figure 6A:
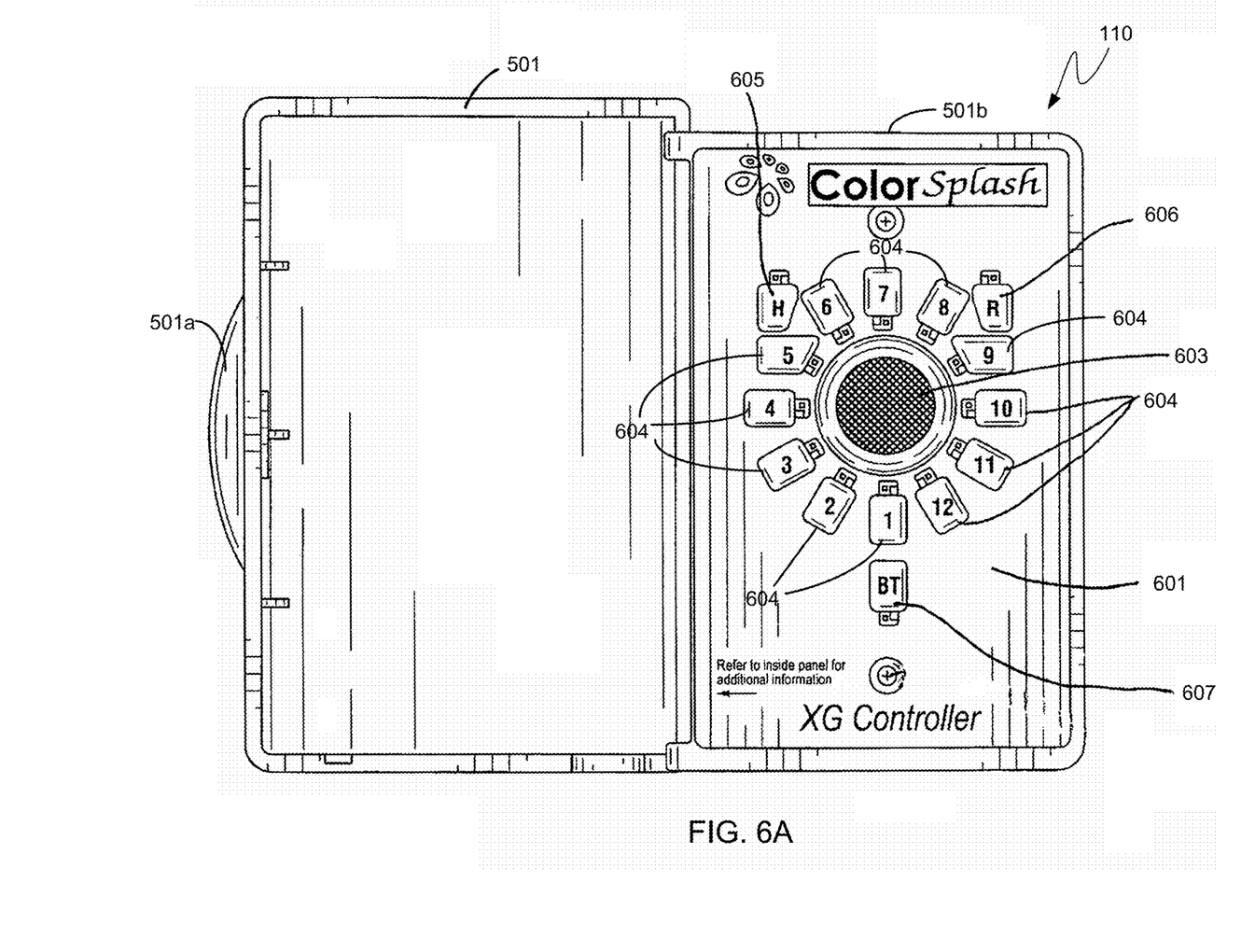
FIG. 6A illustrates a front plan view of the LED lighting control device shown in FIG. 5 with the door in an opened position in which a user interface of the LED lighting control device is accessible by a user to allow the user to interact with the user interface.
Figure 6B:
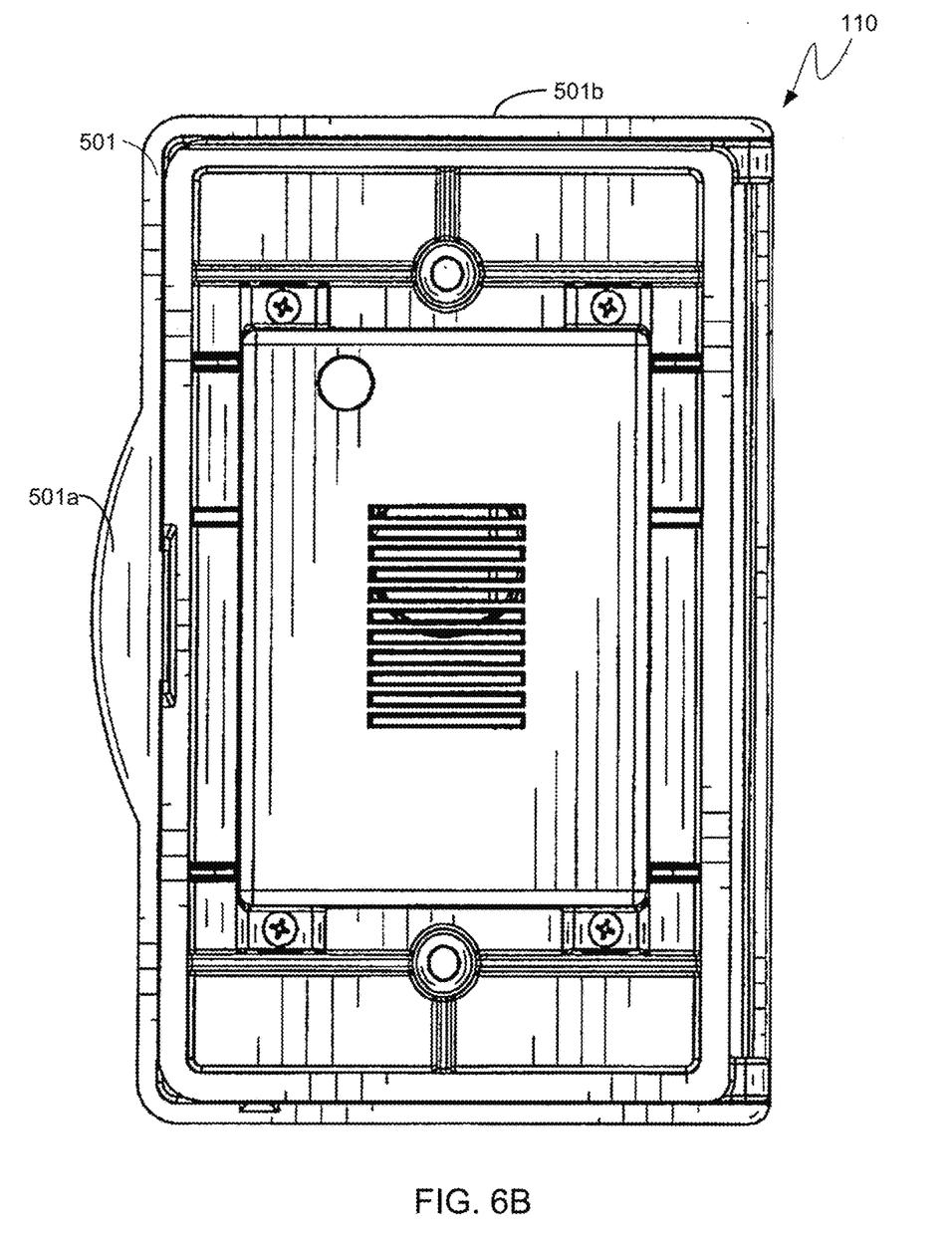
FIG. 6B illustrates a back plan view of the LED lighting control device shown in FIG. 5 with the door in the closed position.
Figure 6C:
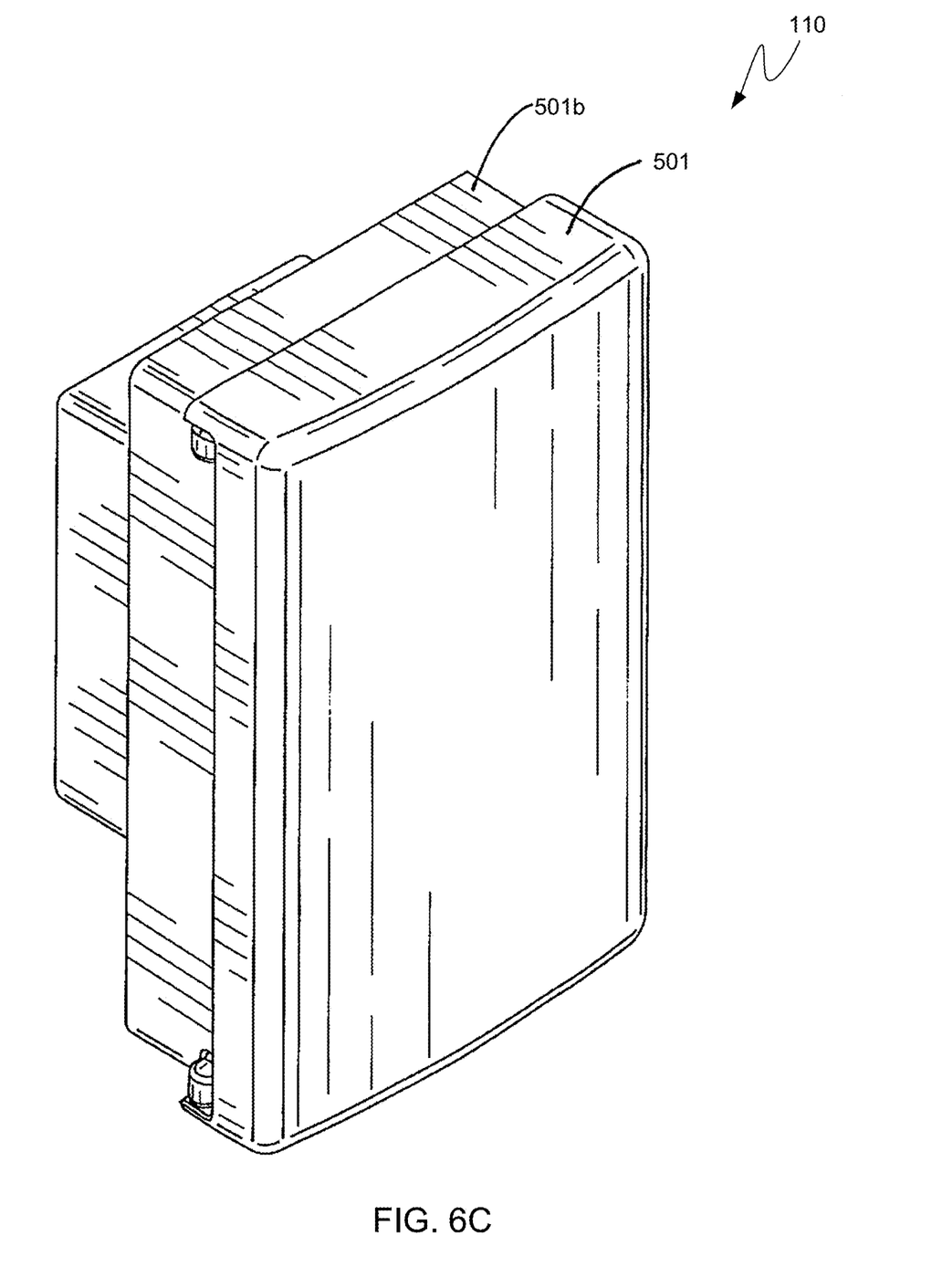
FIG. 6C illustrates a front perspective view of the LED lighting control device shown in FIG. 5 with the door in the closed position.
Figure 6D:
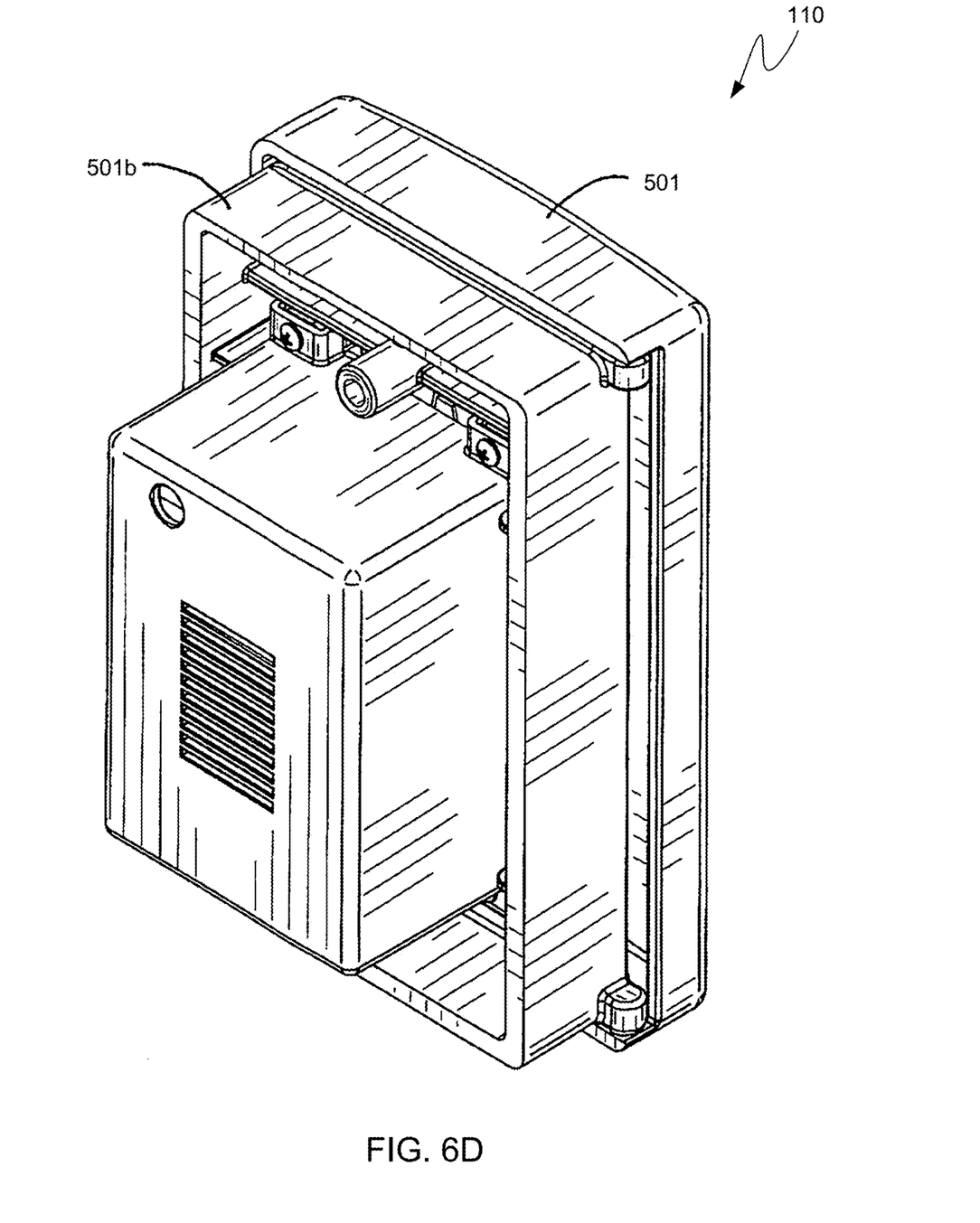
FIG. 6D illustrates a back perspective view of the LED lighting control device shown in FIG. 5 with the door in the closed position.

FIG. 6A illustrates a front plan view of the LED lighting control device 110 with the door 501 in an opened position such that a UI 601 is accessible by a user to allow the user to interact with the UI 601. FIG. 6B illustrates a back plan view of the LED lighting control device 110 with the door 501 in the closed position. FIG. 6C illustrates a front perspective view of the LED lighting control device 110 with the door 501 in the closed position. FIG. 6D illustrates a back perspective view of the LED lighting control device 110 with the door 501 in the closed position. FIG. 6C illustrates a front perspective view of the LED lighting control device shown in FIG. 5 with the door 501 in the closed position. FIG. 6D illustrates a back perspective view of the LED lighting control device shown in FIG. 5 with the door in the closed position.

With reference again to FIG. 6A, in accordance with this representative embodiment, the UI 601 comprises a control panel having an on/off button 603, a plurality of lighting scheme icons 604, a hold button 605, a recall button 606 and a Bluetooth button 607. Each of the lighting scheme icons 604 corresponds to a respective pre-programmed lighting scheme. In accordance with a representative embodiment, a plurality of the pre-programmed lighting scheme icons 604 correspond to respective solid colors and a plurality of the lighting scheme icons 604 correspond to respective color light shows. During manual operations of the LED lighting control device 110, when the user selects one of the lighting scheme icons 604 by pressing the corresponding lighting scheme icon 604, the selected lighting scheme icon 604 is illuminated to indicate the active selection. If the recall button 606 is selected by the user, the last color or color show that was displayed becomes the current active selection. Depressing the hold button 605 causes the LED lighting control device 110 to lock to the color that is currently displayed. Depressing the Bluetooth button 607 causes the LED lighting control device 110 to enter the remote mode of operations during which the LED lighting control device 110 is remotely controlled by the Bluetooth-enabled device 120 operated by a user.

With reference again to FIG. 5, the Bluetooth-enabled device 120 executes a the lighting application program that causes a UI 520 of the Bluetooth-enabled device 120 to be displayed on a display device 530 of the Bluetooth-enabled device 120 that preferably looks identical or very similar to the UI 601 of the LED lighting control device 110 shown in FIG. 6A. In other words, the UI 520 of the Bluetooth-enabled device 120 comprises a control panel having an on/off button similar or identical to button 603 and performing the same function, a plurality of lighting scheme icons similar or identical to the lighting scheme icons 604 and performing the same functions, a hold button similar or identical to hold button 605 and performing the same function, a recall button similar or identical to recall button 606 and performing the same function, and a Bluetooth button similar or identical to Bluetooth button 607 and performing the same function.

The configuration of the Bluetooth-enabled device 120 is similar or identical to the configuration of the LED lighting control device 110 shown in FIG. 2, except that the lighting application program that is executed by processing logic of the Bluetooth-enabled device 120 is different from the lighting application program 232 that is executed by the processing logic 230 of the LED lighting control device 110 since the lighting application program 232 performs the functions described above with reference to FIG. 3, whereas the lighting application program executed by the Bluetooth-enabled device 120 performs the functions described above with reference to FIG. 4.

Figure 7:
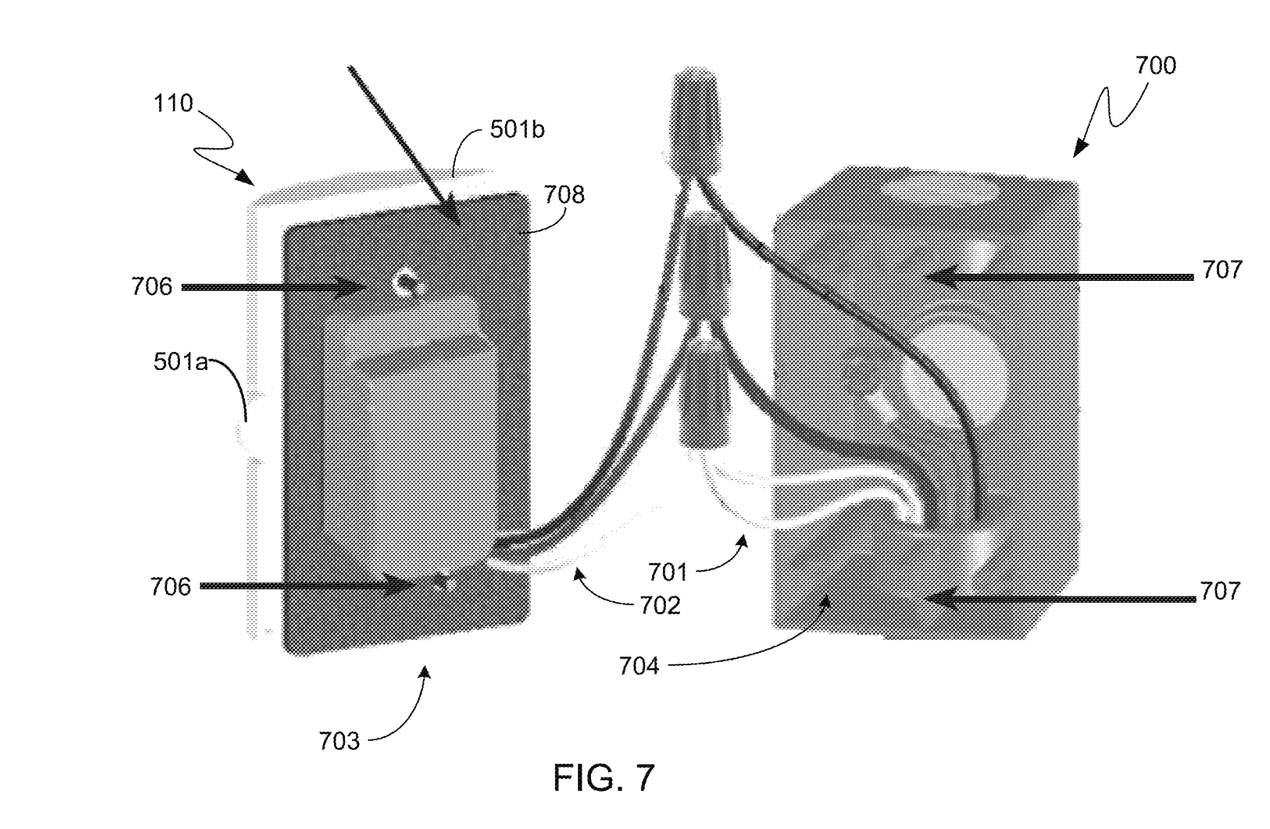
FIG. 7 illustrates back perspective views of the LED lighting control device and of an outlet box, which is used to mount the LED lighting control device on a structure and to electrically interconnect circuitry of the LED lighting controller to the outdoor LED lighting.

FIG. 7 illustrates back perspective views of the LED lighting control device 110 and of an outlet box 700, which is used to mount the LED lighting control device 110 on a structure and to electrically interconnect circuitry of the LED lighting control device 110 to the outdoor LED lighting 101. In accordance with a representative embodiment, the outlet box 700 is a UL-certified standard outlet box having a box size of 4.25"×2.75"×2". The outlet box 700 having these dimensions is well suited for replacing existing lighting on/off switches, timers and other lighting control devices. The outlet box 700 is secured to a structure (not shown) that is typically physically near the location of the outdoor LED lighting 101. Electrical wiring 701 of the outdoor LED lighting 101 is fed through an opening in the the outlet box 700 and is electrically connected to electrical wiring 702 of the LED lighting control device 110. After the electrical interconnections have been made, a backside 703 of the LED lighting control device 110 is inserted into a cavity 704 of the outlet box 700 and screws 706 and threaded openings 707 are used to secure the LED lighting control device 110 to the outlet box 700. If the outlet box 700 is installed in a location where there is dampness, an optional sealing gasket 708 is disposed on the backside 703 of the LED lighting control device 110 prior to securing the LED lighting control device 110 to the outlet box 700.

Figure 8:
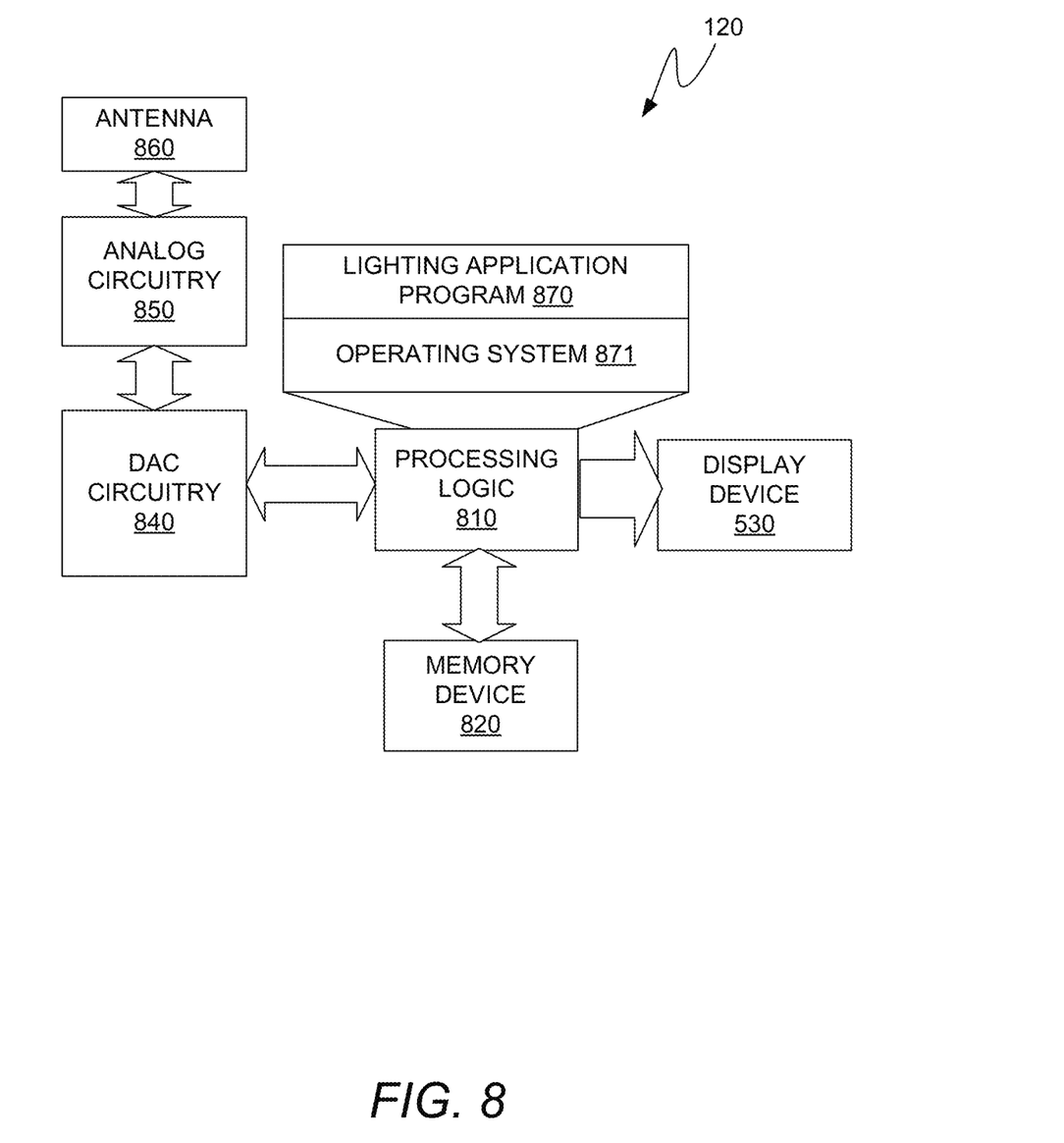
FIG. 8 illustrates a block diagram of the Bluetooth-enabled device shown in FIG. 1 in accordance with a representative embodiment.

FIG. 8 illustrates a block diagram of the Bluetooth-enabled device 120 in accordance with a representative embodiment. The Bluetooth-enabled device 120 comprises processing logic 810, a memory device 820, a display device 530 (discussed above with reference to FIG. 5), DAC circuitry 840, front end analog circuitry 850, and an antenna 860. The memory device 820 stores computer instructions comprising a lighting application program 870 that is executed by the processing logic 810 when the LED lighting control device 110 is operating in the remote mode of operations and is being controlled remotely by a user via the Bluetooth-enabled device 120. The processing logic 810 executes computer instructions comprising an operating system 871 that controls the operations of the Bluetooth-enabled device 120, including operations performed by the Bluetooth-enabled device 120 when the processing logic 810 is executing the lighting application program 870.

The lighting application program 870 that is executed by the Bluetooth-enabled device 120 causes the UI 520 (FIG. 5) of the Bluetooth-enabled device 120 to be displayed on the display device 530 of the Bluetooth-enabled device 120. The user makes selections on the UI 520 displayed on the display device 530. The processing logic 810 generates one or more digital signals representing one or more commands corresponding to the user's selection. The DAC circuitry 840 converts the one or more digital signals into one or more analog signals and outputs them to the analog circuitry 850. The analog circuitry 850 converts the one or more analog signals into one or more Bluetooth wireless signals and causes the antenna 860 to transmit the one or more Bluetooth wireless signals over the Bluetooth wireless link 103 to the LED lighting control device 110, which then performs the operations described above to control the outdoor LED lighting 101.

The processing logic 810 is typically a device that is programmable with software and/or firmware, such as a microprocessor or a microcontroller, for example. The processing logic 810 may comprise other types of logic such as, for example, a PGA, a PLA, an ASIC, etc. The memory device 820 and the processing logic 810 may be integrated into a single device, such as an IC chip, or they may be separate devices, such as separate IC chips that are interconnected via a bus. The memory device 820 is typically a solid state memory device, such as a RAM chip, a ROM chip or a flash memory chip, for example, but could be some other type of memory device, such as an optical or magnetic memory device, for example.

It should be noted that embodiments described herein are intended to demonstrate inventive principles and concepts and that the inventive principles and concepts are not limited to these embodiment. For example, the configuration of the LED lighting control device 110 shown in FIG. 2 is an example of one suitable configuration of the LED lighting control device 110, but other suitable configurations can be used. These and many other modifications can be made to the representative embodiment without deviating from the scope of the invention, as will be understood by those of skill in the art in view of the description provided herein.

What is claimed is:

1. A light emitting diode (LED) lighting control device for controlling outdoor LED lighting, the LED lighting control device comprising:

processing logic configured to be operated in a remote mode of operations or in a manual mode of operations, wherein when the processing logic is operated in the remote mode of operations, the processing logic:
processes one or more digital signals representing one or more commands transmitted wirelessly as one or more wireless signals over a Bluetooth wireless network from a Bluetooth-enabled device to the LED lighting control device to interpret said one or more commands;
selects a lighting scheme from a plurality of lighting schemes to be displayed by the outdoor LED lighting based on the interpretation of said one or more commands by the processing logic; and
controls the outdoor LED lighting to cause the outdoor LED lighting to display the selected lighting scheme.

2. The LED lighting control device of claim 1, further comprising:
an antenna that receives said one or more wireless signals;
analog circuitry electrically coupled to the antenna that converts said one or more wireless signals into one or more analog signals containing said one or more commands; and
analog-to-digital conversion (ADC) circuitry that converts said one or more analog signals into said one or more digital signals that are processed by the processing logic.

3. The LED lighting control device of claim 2, further comprising:
a memory device in communication with the processing logic, the memory device storing computer instructions that are executed by the processing logic.

4. The LED lighting control device of claim 1, wherein the lighting schemes are pre-programmed lighting schemes, a plurality of the pre-programmed lighting schemes corresponding to respective different colors, a plurality of the pre-programmed lighting schemes corresponding to respective different light shows.

5. The LED lighting control device of claim 4, further comprising:
a user interface (UI), wherein the UI has a plurality of icons associated with the pre-programmed lighting schemes, wherein each icon corresponds to a respective pre-programmed lighting scheme, wherein each icon is manually selectable to cause the LED lighting control device to cause the respective pre-programmed lighting scheme to be displayed by the outdoor LED lighting.

6. The LED lighting control device of claim 5, wherein the UI includes a plurality of buttons that are manually selectable by a user to cause the LED lighting control device to control the outdoor LED lighting in a specific manner.

7. The LED lighting control device of claim 6, further comprising:
an outlet box configured to be secured to a structure and to a housing of the LED lighting control device, the housing of the LED lighting control device including a door that can be placed in an opened position and in a closed position, wherein when the LED lighting control device is secured to the outlet box, the door can be moved from the closed position to the opened position, and vice versa, wherein when the door is in the opened position, the UI is accessible by a user to allow the user to manually operate the LED lighting control device.

8. A Bluetooth-enabled device for remotely controlling a light emitting diode (LED) lighting control device that is electrically coupled to outdoor LED lighting, the Bluetooth-enabled device comprising:

processing logic configured to:
generate one or more digital signals representing one or more commands corresponding to a user's selection on a user interface (UI) of the Bluetooth-enabled device of a lighting scheme to be displayed by the outdoor LED lighting, the lighting scheme selected by the user being one of a plurality of lighting schemes that the outdoor LED lighting is displaying; and
cause one or more Bluetooth wireless signals representing the one or more commands to be sent over a Bluetooth wireless link to the LED lighting control device.

9. The Bluetooth-enabled device of claim 8, further comprising:
digital-to-analog conversion (DAC) circuitry that converts the one or more digital signals generated by the processing logic into one or more analog signals and outputs the one or more analog signals;
analog circuitry that receives the one or more analog signals output by the DAC circuitry and converts the one or more analog signals into the one or more Bluetooth wireless signals; and
an antenna electrically coupled to the analog circuitry, the antenna transmitting the one or more Bluetooth wireless signals over the Bluetooth wireless link to the LED lighting control device to cause the LED lighting control device to control the outdoor LED lighting in accordance with the one or more commands.

10. The Bluetooth-enabled device of claim 9, further comprising:
a memory device in communication with the processing logic, the memory device storing computer instructions that are executed by the processing logic.

11. The Bluetooth-enabled device of claim 8, wherein the lighting schemes are pre-programmed lighting schemes, a plurality of the pre-programmed lighting schemes corresponding to respective different colors, a plurality of the pre-programmed lighting schemes corresponding to respective different light shows.

12. The Bluetooth-enabled device of claim 11, wherein the UI has a plurality of lighting scheme icons, each lighting scheme icon corresponding to a respective pre-programmed lighting scheme, wherein each lighting scheme icon is manually selectable to cause the LED lighting control device to cause the respective pre-programmed lighting scheme to be displayed by the outdoor LED lighting.

13. The Bluetooth-enabled device of claim 8, wherein the processing logic executes a software application program that controls operations of the processing logic.

14. A control device for outdoor lighting comprising:
a housing; and
control circuitry within the housing, said control circuitry being programmed to communicate with, and to cause, a plurality of light emitters emit light in a lighting scheme that has been selected from a plurality of different pre-programmed lighting schemes, wherein the control circuity comprises Bluetooth circuitry which enables a separate Bluetooth device to be paired with or wirelessly connected to the control device so that the separate Bluetooth device is used to select a particular lighting scheme from said plurality of different pre-programmed lighting schemes.

15. A method for controlling outdoor light emitting diode (LED) lighting, the method comprising:
in an LED lighting control device electrically coupled to the outdoor LED lighting, receiving a wireless signal representing one or more commands transmitted wirelessly over a Bluetooth wireless network from a Bluetooth-enabled device to the LED lighting control device;
in processing logic of the LED lighting control device, processing a digital representation of the wireless signal to interpret said one or more commands and selecting a lighting scheme from a plurality of lighting schemes for the outdoor LED lighting; and
with the processing logic, controlling the outdoor LED lighting to cause the outdoor LED lighting to display the selected lighting scheme.

16. The method of claim 15, wherein the lighting schemes are pre-programmed lighting schemes, a plurality of the pre-programmed lighting schemes corresponding to respective different colors, a plurality of the pre-programmed lighting schemes corresponding to respective different light shows.

17. The method of claim 16, further comprising:
providing a user interface (UI) on the LED lighting control device having a plurality of icons, each icon corresponding to a respective pre-programmed lighting scheme, wherein each icon is manually selectable by a user to cause the LED lighting control device to cause the respective pre-programmed lighting scheme to be displayed by the outdoor LED lighting.

18. A method for controlling outdoor light emitting diode (LED) lighting, the method comprising:
with a Bluetooth-enabled device configured to remotely control the outdoor LED lighting, executing a lighting application program that generates one or more commands in response to a user selection on the Bluetooth-enabled device of a lighting scheme from a plurality of lighting schemes that the outdoor LED lighting is displaying; and
with the Bluetooth-enabled device, causing a wireless signal containing said one or more commands to be sent over a Bluetooth wireless network to an LED lighting control device that is electrically coupled to the outdoor LED lighting, wherein the LED lighting control device is configured to receive the wireless signal, process a digital representation of the wireless signal to interpret said one or more commands and
to cause the outdoor LED lighting to display the lighting scheme corresponding to the user selection.

19. The method of claim 18, wherein the Bluetooth-enabled device has a user interface (UI) having a plurality of icons, each icon corresponding to a respective lighting scheme that the outdoor LED lighting is capable of displaying, the method further comprising:
in processing logic of the Bluetooth-enabled device, executing the lighting application program, the lighting application program detecting a selection by a user of the Bluetooth-enabled device of one of the plurality of icons, the icon selected by the user corresponding to said user selection; and
in the processing logic executing the lighting application program, generating one or more digital signals representing the one or more commands.

20. The method of claim 19, wherein the lighting application program is a downloadable software application program that is downloaded to a memory device of the Bluetooth-enabled device.

* * * * *